(12) United States Patent
Long (10) Patent No.: US 12,198,461 B2
(45) Date of Patent: Jan. 14, 2025

(54) DISPLAY PANEL AND DISPLAY DEVICE

(71) Applicant: Wuhan China Star Optoelectronics Technology Co., Ltd., Hubei (CN)

(72) Inventor: Yaqiong Long, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/433,392

(22) PCT Filed: May 18, 2021

(86) PCT No.: PCT/CN2021/094293
§ 371 (c)(1),
(2) Date: Nov. 3, 2022

(87) PCT Pub. No.: WO2022/227131
PCT Pub. Date: Nov. 3, 2022

(65) Prior Publication Data
US 2024/0046693 A1   Feb. 8, 2024

(30) Foreign Application Priority Data

Apr. 27, 2021   (CN) .......................... 202110458665.7

(51) Int. Cl.
*G06V 40/13*   (2022.01)
*G02F 1/1333*  (2006.01)

(52) U.S. Cl.
CPC ...... *G06V 40/1318* (2022.01); *G02F 1/13338* (2013.01)

(58) Field of Classification Search
CPC ............ G06V 40/1318; G06V 2201/02; G02F 1/13338; G02F 1/133512; G02F 1/133514; G02F 1/1333; G02F 1/133526
See application file for complete search history.

(56) References Cited

U.S. PATENT DOCUMENTS

2020/0348550 A1*  11/2020  Wu .................... G06V 40/1318

FOREIGN PATENT DOCUMENTS

| CN | 109271831 | 1/2019 |
|---|---|---|
| CN | 110187546 | 8/2019 |
| CN | 211375624 | 8/2020 |
| CN | 111860172 | 10/2020 |
| CN | 111950337 | 11/2020 |
| CN | 111989690 | 11/2020 |
| CN | 112232306 | 1/2021 |

* cited by examiner

*Primary Examiner* — Abhishek Sarma (57) ABSTRACT

A display panel and a display device are provided. The display panel includes a fingerprint identification module. The fingerprint identification module includes a light sensor and a light-shielding layer disposed on a light incident side of the light sensor. The light-shielding layer is provided with a light-transmitting hole. A light filter structure is disposed in the light-transmitting hole. The display panel and the display device can filter out red light and near-infrared light entering the fingerprint identification module, so that the display panel can successfully perform fingerprint identifications even in a strong light environment.

19 Claims, 5 Drawing Sheets

DISPLAY PANEL AND DISPLAY DEVICE

RELATED APPLICATIONS

This application is a National Phase of PCT Patent Application No. PCT/CN2021/094293 having International filing date of May 18, 2021, which claims the benefit of priority of Chinese Patent Application No. 202110458665.7 filed on Apr. 27, 2021. The contents of the above applications are all incorporated by reference as if fully set forth herein in their entirety.

FIELD AND BACKGROUND OF THE INVENTION

This present disclosure relates to the field of display technologies, and in particular to a display panel capable of realizing fingerprint identification in a strong light environment and a display device using the display panel.

With the development of display technologies, terminals and users have put forward higher requirements for display devices. The development trend of full screens is irreversible. Display devices with an integrated fingerprint recognition function came into being and are widely used in fields of mobile phones, tablets, computers, and smart wearable devices.

Existing fingerprint identification technologies mainly include a capacitive fingerprint identification and an optical fingerprint identification. The optical fingerprint identification has become a hot spot in current research because it is easier to integrate into the display devices and is more in line with the development trend of the full screens.

Applications of the optical fingerprint identification technology to active light-emitting display panels is a relatively mature technology. Applications of the optical fingerprint identification technology to passively illuminated liquid crystal displays is a relatively immature technology due to its technical difficulty. Therefore, how to improve the applications of the optical fingerprint recognition technology in the liquid crystal displays is a problem that the existing optical fingerprint recognition technology urgently needs to solve.

In addition, in an environment with strong sunlight, such as outdoors, infrared light and near-infrared light are strong and have a high transmittance for fingers, causing users to often fail to perform an unlock operation. Therefore, how to improve a fingerprint identification ability of a display screen, especially a liquid crystal display (LCD) screen, in strong light environments such as outdoor places without affecting normal display is an issue to be solved.

Accordingly, it is necessary to provide a display panel and a display device to solve the above technical problems.

SUMMARY OF THE INVENTION

In order to solve the above technical problems, the present disclosure provides a display panel and a display device using the display panel. The display panel is provided with a light filter structure in a light-transmitting hole of a light-shielding layer, which can filter out red light and near-infrared light entering a fingerprint identification module, so that the red light and the near-infrared light cannot reach a light sensor. Therefore, the display panel can successfully perform fingerprint identifications even in a strong light environment.

The present disclosure provides a display panel, including a fingerprint identification module. The fingerprint identification module includes a light sensor and a light-shielding layer, and the light sensor is configured to receive light to generate a fingerprint identification signal.

The light-shielding layer is disposed on a light incident side of the light sensor, and the light-shielding layer is formed with a light-transmitting hole.

At least one light filter structure is disposed in the light-transmitting hole, and the light filter structure is configured to filter out all or a partial of preset wavelengths.

When the light enters the light sensor through the light-transmitting hole, the light filter structure filters the light.

The preset wavelengths are greater than or equal to 600 nanometers.

The light filter structure is a color resist, a light-absorbing layer, or a composite layer stacked with the color resist and the light-absorbing layer, and the light filter structure is capable of filtering out all or the partial of the preset wavelengths.

Alternatively, in some embodiment of the present disclosure, the fingerprint identification module is disposed in the display panel and disposed in a display area of the display panel.

The display panel includes a color filter substrate, the color filter substrate includes a color resist layer, and the color resist layer includes a plurality of color resists of different colors.

If the light filter structure is one of the color resists, the color resist of the light filter structure and the color resist layer are arranged in a same layer.

Alternatively, in some embodiment of the present disclosure, the color resists of the color resist layer include a red color resist, a green color resist, and a blue color resist, and the color resist of the light filter structure is the green color resist or the blue color resist.

Alternatively, in some embodiment of the present disclosure, the light-shielding layer includes a first sub-layer disposed on the same layer as the color resist layer, the first sub-layer includes a first via hole configured to form the light-transmitting hole, and the first via hole is configured to set the light filter structure.

Alternatively, in some embodiment of the present disclosure, the light-shielding layer further includes a third sub-layer, the third sub-layer is disposed in the color filter substrate, the third sub-layer is disposed on a side of the first sub-layer away from an array substrate, the third sub-layer includes a third via hole configured to form the light-transmitting hole, and the third via hole is configured to set the light filter structure.

Alternatively, in some embodiment of the present disclosure, the display panel further includes an array substrate.

The light-shielding layer further includes a second sub-layer disposed in the array substrate, the second sub-layer includes a second via hole configured to form the light-transmitting hole, and the second via hole is configured to set the light filter structure.

Alternatively, in some embodiment of the present disclosure, the light sensor is disposed on the array substrate, and the light sensor is disposed on a light-emitting side of the second sub-layer.

Alternatively, in some embodiment of the present disclosure, the fingerprint identification module further includes an optical lens, and the optical lens is disposed on a light incident side of the light-shielding layer and is configured to converge light that will enter the light-transmitting hole.

Correspondingly, the present disclosure also provides another display panel, including a fingerprint identification module. The fingerprint identification module includes a light sensor and a light-shielding layer, and the light sensor is configured to receive light to generate a fingerprint identification signal.

The light-shielding layer is disposed on a light incident side of the light sensor, and the light-shielding layer is formed with a light-transmitting hole.

At least one light filter structure is disposed in the light-transmitting hole, and the light filter structure is configured to filter out all or a partial of preset wavelengths.

When the light enters the light sensor through the light-transmitting hole, the light filter structure filters the light.

Alternatively, in some embodiment of the present disclosure, the preset wavelengths are greater than or equal to 600 nanometers.

Alternatively, in some embodiment of the present disclosure, the light filter structure is a color resist, a light-absorbing layer, or a composite layer stacked with the color resist and the light-absorbing layer, and the light filter structure is capable of filtering out all or the partial of the preset wavelengths.

Alternatively, in some embodiment of the present disclosure, the fingerprint identification module is disposed in the display panel and disposed in a display area of the display panel.

The display panel includes a color filter substrate, the color filter substrate includes a color resist layer, and the color resist layer includes a plurality of color resists of different colors.

If the light filter structure is one of the color resists, the color resist of the light filter structure and the color resist layer are arranged in a same layer.

Alternatively, in some embodiment of the present disclosure, the color resists of the color resist layer include a red color resist, a green color resist, and a blue color resist, and the color resist of the light filter structure is the green color resist or the blue color resist.

Alternatively, in some embodiment of the present disclosure, the light-shielding layer includes a first sub-layer disposed on the same layer as the color resist layer, the first sub-layer includes a first via hole configured to form the light-transmitting hole, and the first via hole is configured to set the light filter structure.

Alternatively, in some embodiment of the present disclosure, the light-shielding layer further includes a third sub-layer, the third sub-layer is disposed in the color filter substrate, the third sub-layer is disposed on a side of the first sub-layer away from an array substrate, the third sub-layer includes a third via hole configured to form the light-transmitting hole, and the third via hole is configured to set the light filter structure.

Alternatively, in some embodiment of the present disclosure, the display panel further includes an array substrate.

The light-shielding layer further includes a second sub-layer disposed in the array substrate, the second sub-layer includes a second via hole configured to form the light-transmitting hole, and the second via hole is configured to set the light filter structure.

Alternatively, in some embodiment of the present disclosure, the light sensor is disposed on the array substrate, and the light sensor is disposed on a light-emitting side of the second sub-layer.

Alternatively, in some embodiment of the present disclosure, the fingerprint identification module further includes an optical lens, and the optical lens is disposed on a light incident side of the light-shielding layer and is configured to converge light that will enter the light-transmitting hole.

Correspondingly, the present disclosure also provides a display device, including a display panel. The display panel includes a fingerprint identification module, the fingerprint identification module includes a light sensor and a light-shielding layer, and the light sensor is configured to receive light to generate a fingerprint identification signal.

The light-shielding layer is disposed on a light incident side of the light sensor, and the light-shielding layer is formed with a light-transmitting hole.

At least one light filter structure is disposed in the light-transmitting hole, and the light filter structure is configured to filter out all or a partial of preset wavelengths.

When the light enters the light sensor through the light-transmitting hole, the light filter structure filters the light.

In comparison with the prior art, the display panel and display device of the present disclosure can filter out red light and near-infrared light entering the fingerprint identification module by setting the light filter structure in the light-transmitting hole of the light-shielding layer, so that the red light and the near-infrared light cannot reach the light sensor. Thus, the fingerprint identification can be performed successfully on the display panel even in a strong light environment, and a user experience can be improved. In the display panel, the color resist layer of the light filter structure and the color resist layer of the color filter substrate are arranged in the same layer, so that a manufacturing process is easy to implement without increasing manufacturing processes and costs. In addition, by integrating the light-shielding layer and the light sensor on the array substrate and the color filter substrate, the fingerprint identification module can be integrated in the display area. Therefore, a screen-to-body ratio and an integration level of the display panel with the fingerprint identification function can be improved.

DESCRIPTION OF SPECIFIC EMBODIMENTS OF THE INVENTION

The present disclosure provides a physical keyboard input system, a keyboard input method and a storage medium. In order to make purposes, technical solutions, and effects of the present disclosure clearer and specific, the present disclosure will be further described in detail with reference to the accompanying drawings and embodiments. It should be understood that the specific embodiments described herein are only used to explain the present disclosure, and are not used to limit the present disclosure.

The present disclosure provides a display panel and a display device using the display panel. The display panel of the present disclosure can perform fingerprint identifications successfully even in a strong light environment, which greatly improves a user experience. Also, the display panel of the present disclosure improves a screen-to-body ratio and an integration level of the display panel, especially a liquid crystal display panel, by integrating a fingerprint identification module in a display area.

Figure 1:
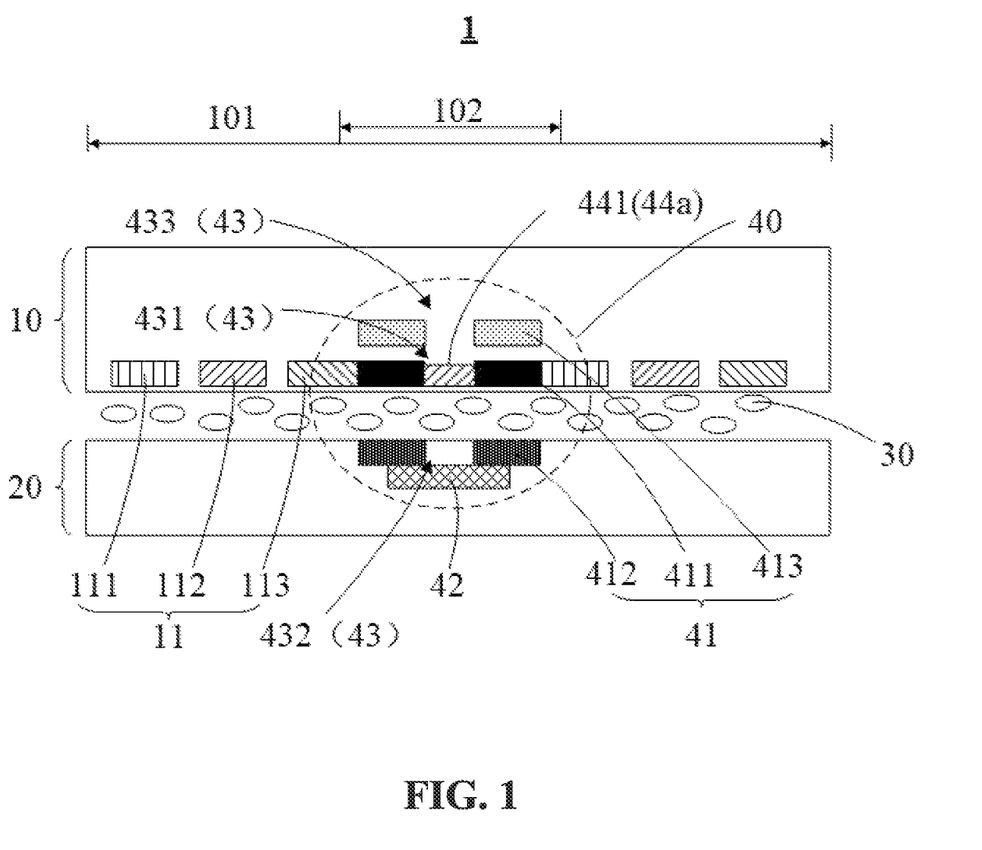
FIG. 1 is a schematic diagram of a display panel of a first embodiment of the present disclosure.

As shown in FIG. 1, a display panel 1 includes a display area 101 and a fingerprint identification area 102 disposed in the display area 101. In some embodiments, the display area 101 may be configured to display images, and the displayed images may be actually viewed by users. The fingerprint identification area 102 may be configured to implement a fingerprint identification function, such as fingerprint unlocking operation. Therefore, the display panel 1 of the present disclosure can realize the fingerprint identification function without affecting a display performance and a screen-to-body ratio.

As shown in FIG. 1, the display panel 1 is provided with a fingerprint identification module 40 in the fingerprint identification area 102. That is, the fingerprint identification module 40 is disposed in the display panel 1 and disposed in the fingerprint identification area 102.

As shown in FIG. 1, the fingerprint identification module 40 includes a light-shielding layer 41 and a light sensor 42.

The light sensor 42 is configured to receive light to generate a fingerprint identification signal.

As shown in FIG. 1, the light-shielding layer 41 is disposed on a light incident side of the light sensor 42. The light-shielding layer 41 is provided with a light-transmitting hole 43. A light filter structure 44 is disposed in the light-transmitting hole 43. The light filter structure 44 is configured to filter out light with preset wavelengths. In some embodiments, the light with preset wavelengths may be red light or near-infrared light. The preset wavelengths are greater than or equal to 600 nanometers. In other embodiments, the light filter structure 44 can also be configured to filter out other preset wavelengths of light, and is not limited to the red light and the near-infrared light. Therefore, the display panel 1 can be adapted to specific use environments.

The incident light configured to generate the fingerprint identification signal may enter the light sensor 42 through the light-shielding layer 41. When external light enters the light sensor 42 through the light-transmitting hole 43, the light filter structure 44 filters the light. Therefore, the red light and the near-infrared light entering the fingerprint identification module 40 can be filtered out, so that the red light and the near-infrared light cannot reach the light sensor 42. Thus, the display panel 1 can also perform fingerprint identifications successfully in a strong light environment, and a user experience is improved.

In a preferred embodiment, the fingerprint identification module further includes an optical lens. The optical lens is disposed on the light incident side of the light-shielding layer, and is configured to converge the light that will enter the light-transmitting hole. Thus, light loss can be reduced and a sensitivity of the fingerprint identification module can be improved.

Structures and specific implementations of the display panel of the present disclosure will be described in detail below.

As shown in FIG. 1, the display panel 1 includes a color filter substrate 10, an array substrate 20, a liquid crystal layer 30, and the fingerprint identification module 40.

Figure 2:
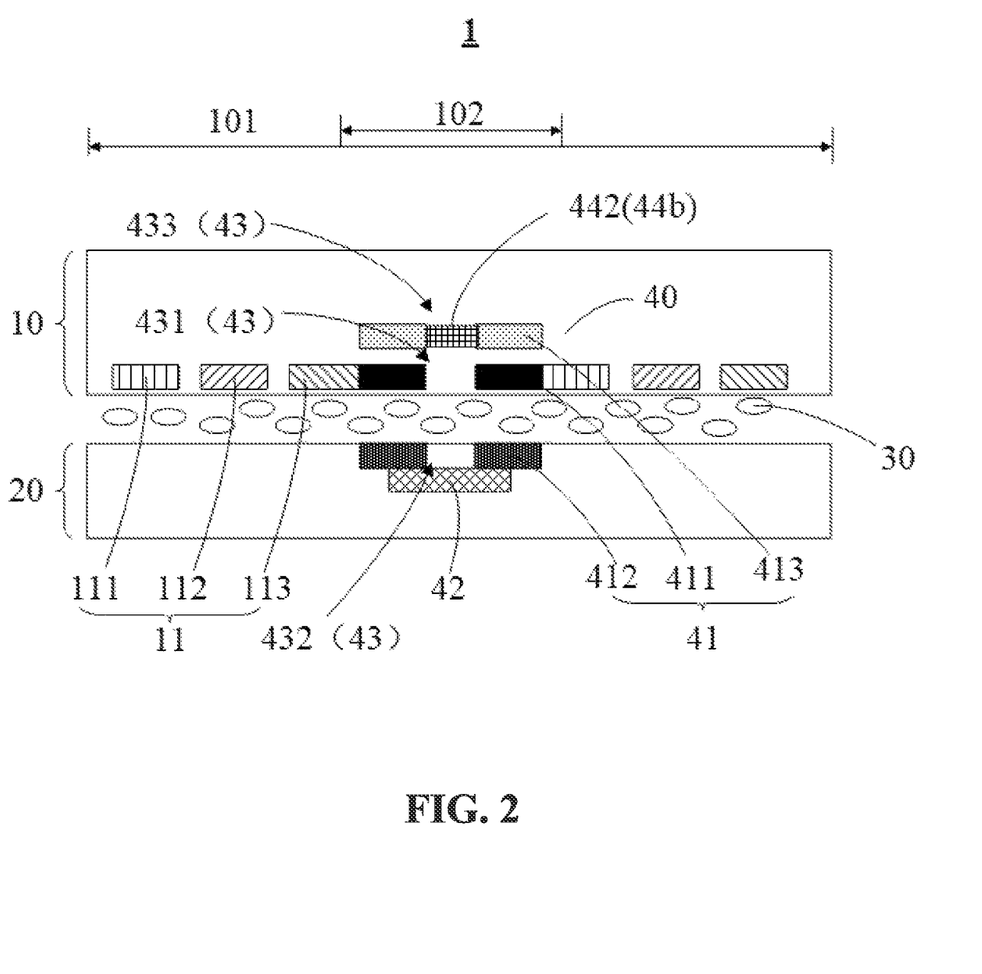
FIG. 2 is a schematic diagram of a display panel of a second embodiment of the present disclosure.

It should be noted that, in order to more directly show structural features of the fingerprint identification module 40 of the present disclosure and its integrated structure in the display panel 1, other film structures of the color filter substrate 10 and the array substrate 20 are not shown in FIG. 1 and FIG. 2. However, those skilled in the art should understand that layer structures actually included in the color filter substrate 10 and the array substrate 20 are not limited to these.

As shown in FIG. 1, the color filter substrate 10 and the array substrate 20 are disposed oppositely, and the liquid crystal layer 30 is sealed between the color filter substrate 10 and the array substrate 20.

As shown in FIG. 1, the color filter substrate 10 includes a color resist layer 11.

As shown in FIG. 1, the color resist layer 11 includes a plurality of color resists arranged at intervals. Light of the display panel 1 is emitted through the color resists of the color resist layer 11 to visually display colors corresponding to the color resists, so that the display panel 1 displays desired images.

As shown in FIG. 1, the color resists of the color resist layer 11 include a red color resist 111, a green color resist 112, and a blue color resist 113. In some specific embodiments, the color resists of different colors can be made of color resist materials of different colors. For example, the red color resist 111, the green color resist 112, and the blue color resist 113 may be made of a red color resist material, a green color resist material, or a blue color resist material, respectively.

Specifically, the color resist layer 11 also includes a black matrix disposed between adjacent color resists, which is not shown in the drawings. The black matrix is disposed in spaces between adjacent color resists. In other words, an orthographic projection of the black matrix on the color resist layer 11 is located between the color resists, so as to prevent light leakage and increase a contrast ratio.

In some specific embodiments, the black matrix may be made of black matrix material. The black matrix material may be an opaque material such as a black photoresist containing carbon black.

It should be noted that the present disclosure does not limit a number or a structure of the color resist layer 11. In this embodiment, the red color resist 111, the green color resist 112, and the blue color resist 113 are sequentially arranged according to a certain rule. For example, they are arranged in a red-green-blue arrangement, a red-green-blue arrangement, or a red-green-blue arrangement. Moreover, it can also be arranged according to other optical requirements, which will not be listed here. In short, the color filter substrate 10 is properly configured to ensure that a normal display function of the display panel 1 is realized.

In this embodiment, the array substrate 20 may include a base substrate. The color resist layer 11 is formed on the base substrate. A plurality of functional layers are further disposed on the base substrate along its thickness direction, such as a multi-layer insulating layer, a metal layer, and a semiconductor layer. The metal layer and the semiconductor layer are disposed in the multi-layer insulating layer. A main purpose of FIG. 1 and FIG. 2 is to highlight an aspect of the color resist layer 11 to clearly show a structural configuration of the color resist layer 11, and does not specifically show the base substrate and other functional layers disposed on the base substrate. The following is only a brief description of the functional layers.

A multi-layer metal layer and the semiconductor layer together form a plurality of thin film transistors and metal traces.

The multi-layer insulating layer includes a buffer layer, a gate insulating layer, an interlayer insulating layer, a planarization layer, or a pixel definition layer. In other embodiments, the multi-layer insulating layer may further include a spacer layer. The multi-layer metal layer includes a gate metal layer and a source-drain metal layer. In other embodiments, the multi-layer metal layer may further include a pixel electrode layer or a metal light-shielding layer.

As shown in FIG. 1, the fingerprint identification module 40 includes the light-shielding layer 41, the light sensor 42, the light-transmitting hole 43, and the light filter structure 44.

As shown in FIG. 1, the light-transmitting hole 43 is formed on the light-shielding layer 41. On the one hand, the light-shielding layer 41 can effectively block ineffective light in the fingerprint identification area 102, which greatly improves an accuracy of the fingerprint identification. On the other hand, the light-transmitting hole 43 can not only allow light to pass through, but also achieve a light collimation effect.

Specifically, the light-shielding layer 41 may be a single-layer film structure, or may be a multi-layer laminated structure.

Referring to FIG. 1, in order to improve the light collimation effect, the light-shielding layer 41 includes a plurality of different layers along a light transmission direction, and each of the layers can be used as an independent light-shielding layer. Also, the light-transmitting hole 43 extends through all the layers of the light-shielding layer 41. Furthermore, each layer includes a through hole to form the light-transmitting hole 43, and the through hole can also be configured for the light filter structure to be disposed.

Specifically, a plurality of the light-transmitting holes 43 may be formed on the light-shielding layer 41. Apertures and/or planar shapes of the different light-transmitting holes 43 may be the same or different. Pitches between the different light-transmitting holes 43 may be the same or different. In order to facilitate manufacture and assembly of the light-shielding layer 41, the apertures, the pitches, and planar shapes of the plurality of light-transmitting holes 43 may be the same. However, in an actual production, one or more of the apertures, the pitches, and the planar shapes can be set to be different according to needs of users. The present disclosure does not limit specific values of the apertures of the light-transmitting holes 43 and the pitches between adjacent light-transmitting holes 43.

Specifically, each of the layers is independently integrated in the display panel 1. Furthermore, in order to improve thin and lightweight characteristics of the display panel 1, one or more layers of the light-shielding layer 41 can be arranged in a same layer as one film layer of the display panel 1.

It should be noted that the present disclosure does not specifically limit the number of layers of the light-shielding layer 41 or positions of the layers of the film layer. In some specific embodiments, the number of layers or the positions of the film layer of the light-shielding layer 41 can be specifically modified according to structures or requirements of the display panel 1 or the fingerprint identification module 40.

In some specific embodiments, the layers of the light-shielding layer 41 may be independently selected from one or more of a metal light-shielding layer, a black resin light-shielding layer, or a composite light-shielding layer. It should be noted that the present disclosure does not specifically limit material or a structure of each layer of the light-shielding layer 41. In some specific embodiments, the layers can be adaptively set according to the positions of the each layer and the structure of the display panel.

As shown in FIG. 1, in this embodiment, the light-shielding layer 41 includes a first sub-layer 411, a second sub-layer 412, and a third sub-layer 413.

As shown in FIG. 1, the first sub-layer 411 is disposed in the color filter substrate 10, and the first sub-layer 411 and the color resist layer 11 of the color filter substrate 10 are arranged on a same film layer. The first sub-layer 411 is provided with a first via hole 431 extending through the first sub-layer 411. The first via hole 431 is configured to form the light-transmitting hole 43, and the first via hole 431 can be configured for the light filter structure 44 to be disposed.

Furthermore, the first sub-layer 411 and the black matrix of the color filter substrate 10 are arranged in a same layer. Also, the first sub-layer 411 and the black matrix can be formed from a same film layer, so that a thickness of an overall display panel will not be increased, and a manufacturing process can be omitted.

As shown in FIG. 1, the second sub-layer 412 is disposed in the array substrate 20. The second sub-layer 412 is provided with a second via hole 432 to form the light-transmitting hole 43. The second via hole 432 can also be configured for the light filter structure 44 to be disposed. The second via hole 432 extends through the second sub-layer 412 and corresponds to the first via hole 431.

In some embodiments, the second sub-layer 412 may be arranged in a same layer as one or more of a multi-layer functional layer of the array substrate 20, so that the thickness of the panel will not be increased.

For example, the second sub-layer 412 may be arranged in a same layer as the metal light-shielding layer of the array substrate 20. Specifically, the metal light-shielding layer of the array substrate 20 may also serve as the second sub-layer 412. In other embodiments, material of the planarization layer of the array substrate 20 may also be changed to a light-shielding material, and the flat layer also serves as the second sub-layer 412.

As shown in FIG. 1, the third sub-layer 413 is disposed in the color filter substrate 10. The third sub-layer 413 is disposed on a side of the first sub-layer 411 away from the array substrate 20. The third sub-layer 413 includes a third via hole 433 configured to form the light-transmitting hole 43. The third via hole 433 can be configured for the light filter structure 44 to be disposed. The third via hole 433 extends through the third sub-layer 413. The third via hole 433 corresponds to the second via hole 432 and the first via hole 431.

Specifically, along the light transmission direction, the third sub-layer 413, the first sub-layer 411, and second sub-layer 412 are arranged in sequence. The first via hole 431, the second via hole 432, and the third via hole 433 together form the light-transmitting hole 43 that allows light to pass through.

At this time, a overlapping structure of the first via hole 431, the second via hole 432, and the third via hole 433 can collimate the light passing through the light-transmitting hole 43.

It should be noted that the present disclosure does not specifically limit the structure or shape of the light-transmitting hole 43. In other embodiments, the number of layers or film positions of the light-shielding layer 41 may be specifically changed according to the structure or requirements of the display panel 1 or the fingerprint identification module 40.

In this embodiment, the first via hole 431, the second via hole 432, and the third via hole 433 are all circular in planar shape. In other embodiments, the first via hole 431, the second via hole 432, and the third via hole 433 may also be independently rhombus or rectangle. Similarly, the present disclosure does not limit the shape and size of the first via hole 431, the second via hole 432, and third via hole 433. For example, in this embodiment, the first via hole 431, the second via hole 432, and the third via hole 433 have a same shape and size. In other embodiments, shapes and sizes of the first via hole 431, the second via hole 432, and the third via hole 433 may be different.

As shown in FIG. 1, the light filter structure 44 is disposed in a partial area of the light-transmitting hole 43, and is configured to filter out light with wavelengths greater than or equal to 600 nm. Thus, the infrared light and the near-infrared light in sunlight can be filtered out. Interference light passing through a finger into the light sensor 42 of the fingerprint identification module 40 is prevented or reduced. It can prevent the fingerprint identification failure due to overexposure of the light sensor 42.

Figure 3:
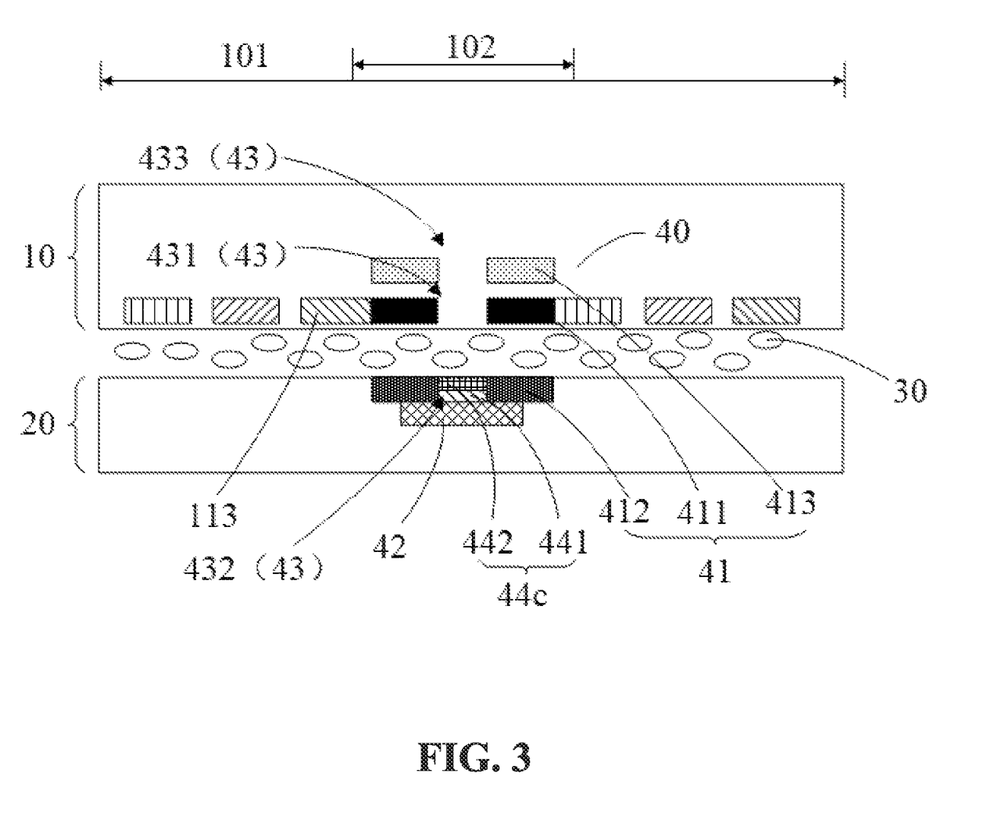
FIG. 3 is a schematic diagram of a display panel of a third embodiment of the present disclosure.

Specifically, the light filter structure 44 may be disposed in through holes of one or more layers of the light-shielding layer 41. Referring to FIG. 1 to FIG. 3, in some embodiments, the light filter structure 44 may be disposed in the first via hole 431, the second via hole 432, or the third via hole 433.

Specifically, the light filter structure 44 includes at least one of a color resist 441 and a light-absorbing layer 442. Furthermore, the light filter structure 44 may include only the color resist 441, may also include only the light-absorbing layer 442, or may include both the color resist 441 and the light-absorbing layer 442. The color resist 441 may be the green color resist or the blue color resist that can absorb the infrared light and the near-infrared light. Similar to the color resist layer 11, the light filter structure 44 can be made of the green color resist material or the blue color resist material. If the light filter structure 44 is the green color resist, it can filter out light with wavelengths greater than 540 nm. If the light filter structure 44 is the blue color resist, it can filter out light with wavelengths greater than 550 nm.

The light-absorbing layer 442 may be made of an infrared light-absorbing material. The infrared light-absorbing material refers to material that has strong absorption for light in an infrared band of the infrared light and the near-infrared light. Similar to the color resist 441, the light-absorbing layer 442 can filter out the red light or the near-infrared light in the light to achieve a same filtering performance as the color resist 441. In a specific embodiment, the material of the light-absorbing layer 442 may be copper phosphate compounds, quantum dots, quinone metal complexes, polymethine compounds, cyanine compounds, phthalocyanine compounds, merocyanine compounds, naphthalocyanine compounds, iminium compounds, diiminium compounds, triarylmethane compounds, dipyrromethene compounds, anthraquinone compounds, diquinone compounds, naphthoquinone compounds, rylene compounds, derivatives thereof, or combinations thereof.

In order to ensure the light filtering effect, a plurality of the light filter structures 44 may also be disposed in the light-transmitting hole. The plurality of light filter structures 44 may adopt the same or different structures, and the present disclosure does not make any limitation on this. Moreover, the plurality of light filter structures 44 can be respectively disposed in different layers.

Referring to FIG. 1, FIG. 2, and FIG. 3, the present disclosure provides three different embodiments of the light filter structure 44. A light filter structure 44a in FIG. 1 is one color resist 441, a light filter structure 44b in FIG. 2 is one light-absorbing layer 442, and a light filter structure 44c in FIG. 3 is a composite layer formed by stacking one color resist 441 and one light-absorbing layer 442.

As shown in FIG. 1, the light filter structure 44a is disposed in the first via hole 431 of the first sub-layer 411. The color resist 441 of the light filter structure 44a is the green color resist. Through the above arrangement, it is possible to obtain a better light transmission performance while ensuring the light filtering performance of the light filter structure 44.

In this embodiment, the color resist 441 of the light filter structure 44a and the color resist layer 11 are arranged in the same layer. Furthermore, the color resist 441 of the light filter structure 44a can be formed in a same film layer as the green color resist 112 of the color resist layer 11.

It should also be noted that the present disclosure does not limit that the light filter structure 44a must be disposed in the first via hole 431. In a specific embodiment, the light filter structure 44a can also be disposed in another through hole of another layer, such as the third via hole 433 or the second via hole 432.

As shown in FIG. 2, the light-absorbing layer 442 of the light filter structure 44b is disposed in the third via hole 433 of the third sub-layer 413.

It should also be noted that the present disclosure does not limit that the light filter structure 44b must be disposed in the third via hole 433. In a specific embodiment, the light filter structure 44b can also be disposed in another through hole of another layer, such as the the second via hole 432 or the first via hole 431.

As shown in FIG. 3, the light filter structure 44c is disposed in the second via hole 432 of the second sub-layer 412.

Referring to FIG. 3, in this embodiment, the composite layer only includes one color resist 441 and one light-absorbing layer 442. Also, the light-absorbing layer 442 is disposed on the color resist 441. In other embodiments, the composite layer may further include a plurality of the light-absorbing layers 442 and a layer of the color resist 441, or may further include a plurality of the color resists 441 and a layer of light-absorbing layer 442. That is, the present disclosure does not limit film position and a number of film layers of the color resist 441 and the light-absorbing layer 442 in the composite layer.

It should also be noted that the present disclosure does not limit that the light filter structure 44c must be disposed in the second via hole 432. In a specific embodiment, the light filter structure 44c can also be disposed in another through hole of another layer, such as the third via hole 433 or the first via hole 431.

As shown in FIG. 1, the light sensor 42 is disposed on the array substrate 20 and is disposed on a side of the second sub-layer 412 away from the color filter substrate 10. The light sensor 42 is configured to receive light to generate the fingerprint identification signal.

Specifically, the fingerprint identification module 40 includes a plurality of light sensors 42 arranged in an array. The light sensors 42 may be arranged in a one-to-one correspondence with the light-transmitting holes 43, or may be arranged in a manner that one light sensor 42 corresponds to the plurality of light-transmitting holes 43.

If the light sensors 42 are arranged in the one-to-one correspondence with the light-transmitting holes 43, positions of the light sensor 42 may be arranged in the one-to-one correspondence with positions of the light-transmitting holes 43. Moreover, orthographic projections of the light sensor 42 and the light-transmitting hole 43 overlap. To ensure that the light sensor 42 can fully receive light, the orthographic projections of the light sensor 42 and the light-transmitting hole 43 overlap.

If the light sensor 42 corresponds to the plurality of light-transmitting holes 43, an orthographic projection of the light sensor 42 covers the plurality of light-transmitting holes 43.

In specific use, the light sensor 42 has a function of sensing light, and can convert the light signal received by it into an electrical signal. For example, specifically, a finger has valleys and ridges. When the finger presses on the display panel, the ridges are in contact with a surface of the display panel, and the valleys are not in contact with the surface of the display panel 1. At this time, a reflectivity of the light irradiating the display panel corresponding to the ridges and the valleys is different, so that light reflected from the ridges and light reflected from the valleys received by the light sensor 42 have different intensities. The light sensor 42 converts the reflected light of different intensities into different photocurrent sizes, so that the ridges and the valleys of the fingerprint can be identified according to the photocurrent sizes, and the plurality of light sensors 42 work together to identify fingerprint information.

In specific embodiment, the light sensor 42 may be, but is not limited to, a thin film transistor or a photodiode. It should be noted that the fingerprint identification module of the present disclosure is not limited to only include the light sensor and the light-shielding layer. In other embodiments, the fingerprint identification module 40 may also include other elements or circuits.

Figure 4:
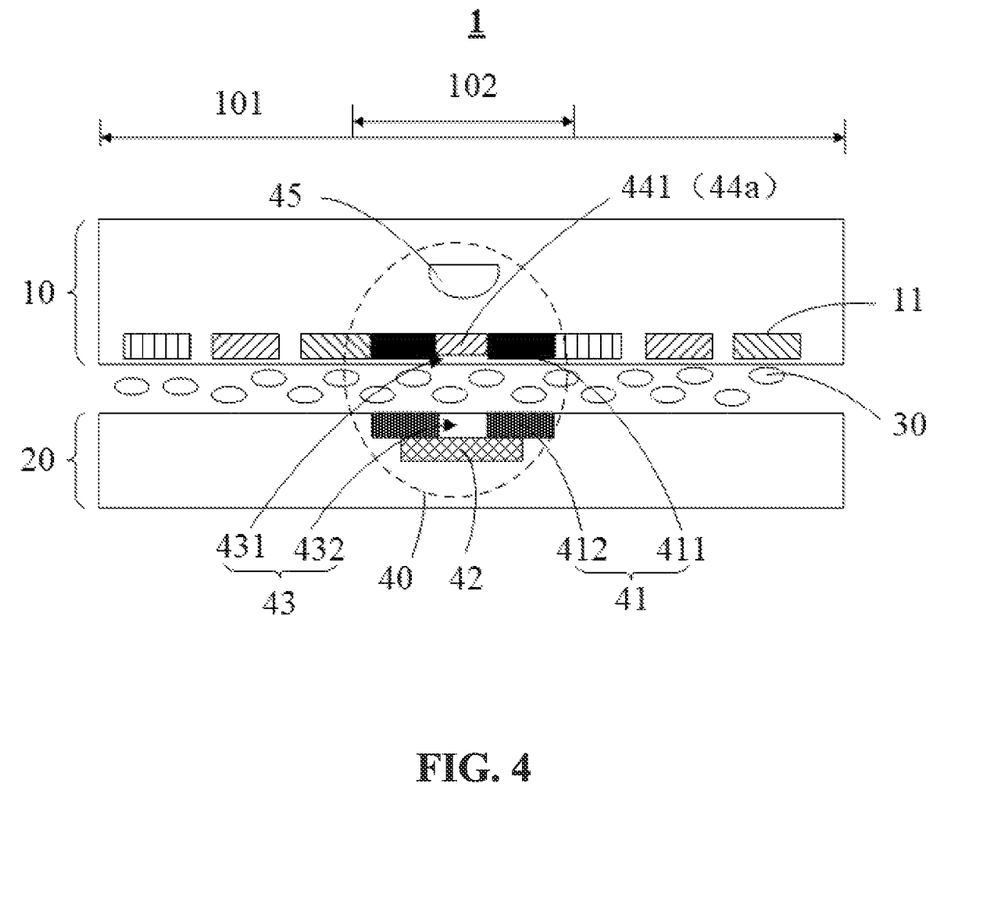
FIG. 4 is a schematic diagram of a display panel of a fourth embodiment of the present disclosure.

FIG. 4 is a schematic diagram of a display panel of a fourth embodiment of the present disclosure. In comparison with the display panel shown in FIG. 1, the biggest difference of the display panel 1 shown in FIG. 4 is that the fingerprint identification module 40 also includes an optical lens 45. The optical lens 45 is disposed on the light incident side of the light-shielding layer 41, and can converge the light entering the light-transmitting hole 43, thereby reducing light loss and improving an accuracy of the fingerprint identification module.

The optical lens 45 can converge light. After the light reflected from the ridges and the valleys of the finger enters the optical lens 45, the light can enter the light sensor 42 through the light-transmitting hole 43 more concentratedly, so that the light sensor 42 has higher detection sensitivity. The optical lens 45 is also beneficial to reduce a size of the light sensor 42 and the fingerprint identification module 40.

As shown in FIG. 4, the optical lens 45 is disposed in the color filter substrate 10, and the optical lens 45 is disposed on a light incident side of the first sub-layer 411. The present disclosure does not limit a specific position of the optical lens 45, as long as the optical lens 45 is disposed on the light incident side of the light-shielding layer 41.

As shown in FIG. 4, the display panel may include a plurality of the optical lenses 45. The optical lenses 45 constitute a micro lens array. The plurality of optical lenses 45 correspond to at least part of the plurality of light-transmitting holes 43. One optical lens 45 corresponds to one light-transmitting hole 43, so that light is converged into the light-transmitting hole 43.

In a preferred embodiment, the optical lens 45 is directly opposite to the first via hole 431 of the first sub-layer 411, so as to realize an alignment design of the optical lens 45 and the light-transmitting hole 43.

As shown in FIG. 4, the optical lens 45 is a convex lens structure. For example, the optical lens 45 may be a plano-convex lens, and a curved surface of the optical lens 45 is set toward the first sub-layer 411. In other embodiments, the optical lens 45 may also be a Fresnel lens. Furthermore, in the display panel 1 shown in FIG. 4, the light-shielding layer 41 only includes the first sub-layer 411 and the second sub-layer 412. The first sub-layer 411 is arranged in the same layer as the color resist layer 11 of the color filter substrate 10. The second sub-layer 412 is disposed on the array substrate 20.

In addition, in the display panel 1 shown in FIG. 4, the light filter structure 44 only includes the color resist 441. The color resist 441 is the green color resist. The color resist 441 and the color resist layer 11 are arranged in the same layer.

Figure 5:
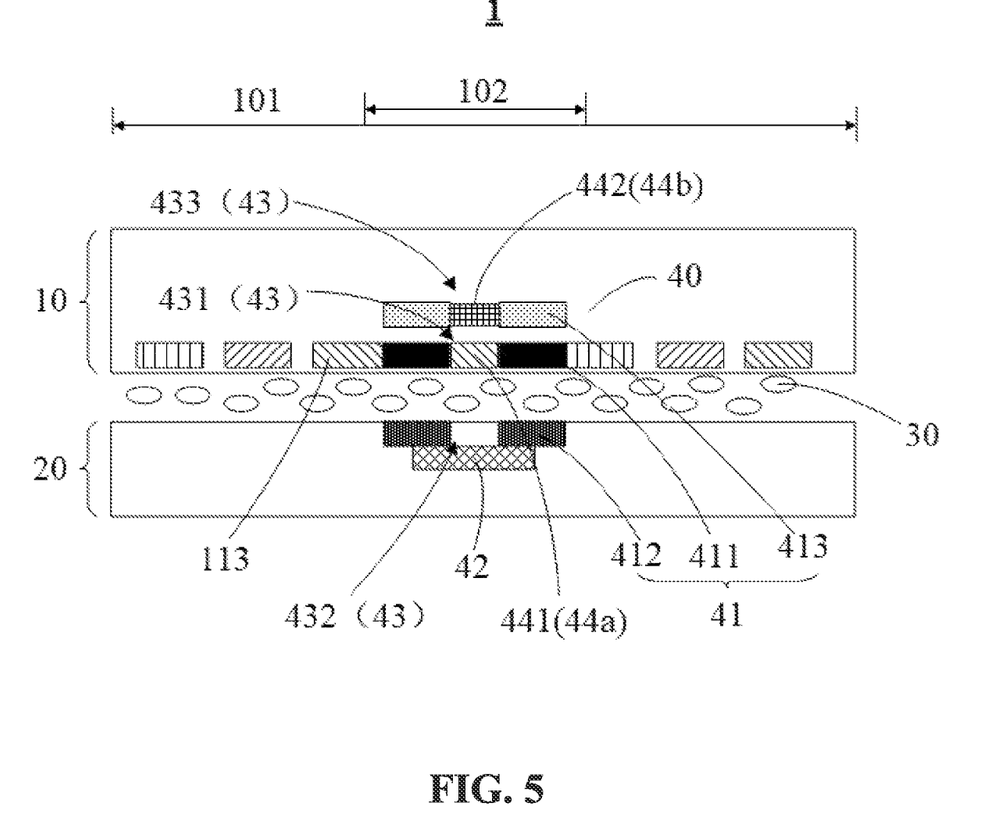
FIG. 5 is a schematic diagram of a display panel of a fifth embodiment of the present disclosure.

FIG. 5 is a schematic diagram of a display panel of a fifth embodiment of the present disclosure. In comparison with the display panel shown in FIG. 1, the biggest difference of the display panel 1 shown in FIG. 5 is that the light filter structures 44a and 44b are disposed in the light-transmitting hole.

In this embodiment, the light filter structure 44a is disposed in the second via hole 432. The light filter structure 44b is disposed in the third via hole 433. Specifically, the present disclosure also provides a display device. The display device includes a display panel of the present disclosure. For the specific structure of the display panel, refer to the above, and the details are not repeated here.

It can be understood that for those of ordinary skill in the art, equivalent replacements or changes can be made according to the technical solution of the present disclosure and its inventive concept, and all these changes or replacements shall belong to the protection scope of the claims of the present disclosure.

What is claimed is:

1. A display panel, comprising an array substrate, a liquid crystal layer and a fingerprint identification module, wherein the fingerprint identification module comprises a light sensor and a light-shielding layer, and the light sensor is configured to receive light to generate a fingerprint identification signal;

wherein the light-shielding layer is disposed on a light incident side of the light sensor, and the light-shielding layer is formed with a light-transmitting hole;

wherein at least one light filter structure is disposed in the light-transmitting hole, and the light filter structure is configured to filter out all or a partial of preset wavelengths; when the light enters the light sensor through the light-transmitting hole, the light filter structure filters the light;

wherein the preset wavelengths are greater than or equal to 600 nanometers; and wherein the light filter structure is composite layer stacked with a color resist and a light-absorbing layer, and the light filter structure is capable of filtering out all or the partial of the preset wavelengths;

wherein the light-shielding layer further comprises a second sub-layer disposed in the array substrate, a side surface of the light-absorbing layer away from the light sensor is flush with a side surface of the second sub-layer away from the light sensor, and both are in contact with the liquid crystal layer.

2. The display panel according to claim 1, wherein the fingerprint identification module is disposed in the display panel and disposed in a display area of the display panel;

wherein the display panel comprises a color filter substrate, the color filter substrate comprises a color resist layer, and the color resist layer comprises a plurality of color resists of different colors; and wherein if the light filter structure is one of the color resists, the color resist of the light filter structure and the color resist layer are arranged in a same layer.

3. The display panel according to claim 2, wherein the color resists of the color resist layer comprise a red color resist, a green color resist, and a blue color resist, and the color resist of the light filter structure is the green color resist or the blue color resist.

4. The display panel according to claim 2, wherein the light-shielding layer comprises a first sub-layer disposed on the same layer as the color resist layer, the first sub-layer comprises a first via hole configured to form the light-transmitting hole, and the first via hole is configured to set the light filter structure.

5. The display panel according to claim 4, wherein the light-shielding layer further comprises a third sub-layer, the third sub-layer is disposed in the color filter substrate, the third sub-layer is disposed on a side of the first sub-layer away from an array substrate, the third sub-layer comprises a third via hole configured to form the light-transmitting hole, and the third via hole is configured to set the light filter structure.

6. The display panel according to claim 1, the second sub-layer comprises a second via hole configured to form the light-transmitting hole, and the second via hole is configured to set the light filter structure.

7. The display panel according to claim 6, wherein the light sensor is disposed on the array substrate, and the light sensor is disposed on a light-emitting side of the second sub-layer.

8. The display panel according to claim 1, wherein the fingerprint identification module further comprises an optical lens, and the optical lens is disposed on a light incident side of the light-shielding layer and is configured to converge light that will enter the light-transmitting hole.

9. A display panel, comprising an array substrate, a liquid crystal layer and a fingerprint identification module, wherein the fingerprint identification module comprises a light sensor and a light-shielding layer, and the light sensor is configured to receive light to generate a fingerprint identification signal;
wherein the light-shielding layer is disposed on a light incident side of the light sensor, and the light-shielding layer is formed with a light-transmitting hole;
wherein at least one light filter structure is disposed in the light-transmitting hole, and the light filter structure is configured to filter out all or a partial of preset wavelengths;
wherein when the light enters the light sensor through the light-transmitting hole, the light filter structure filters the light; and
wherein the light filter structure is a composite layer stacked with the color resist and the light-absorbing layer;
wherein the light-shielding layer further comprises a second sub-layer disposed in the array substrate, a side surface of the light-absorbing layer away from the light sensor is flush with a side surface of the second sub-layer away from the light sensor, and both are in contact with the liquid crystal layer.

10. The display panel according to claim 9, wherein the preset wavelengths are greater than or equal to 600 nanometers.

11. The display panel according to claim 9, wherein the light filter structure is capable of filtering out all or the partial of the preset wavelengths.

12. The display panel according to claim 11, wherein the fingerprint identification module is disposed in the display panel and disposed in a display area of the display panel;
wherein the display panel comprises a color filter substrate, the color filter substrate comprises a color resist layer, and the color resist layer comprises a plurality of color resists of different colors; and
wherein if the light filter structure is one of the color resists, the color resist of the light filter structure and the color resist layer are arranged in a same layer.

13. The display panel according to claim 12, wherein the color resists of the color resist layer comprise a red color resist, a green color resist, and a blue color resist, and the color resist of the light filter structure is the green color resist or the blue color resist.

14. The display panel according to claim 12, wherein the light-shielding layer comprises a first sub-layer disposed on the same layer as the color resist layer, the first sub-layer comprises a first via hole configured to form the light-transmitting hole, and the first via hole is configured to set the light filter structure.

15. The display panel according to claim 14, wherein the light-shielding layer further comprises a third sub-layer, the third sub-layer is disposed in the color filter substrate, the third sub-layer is disposed on a side of the first sub-layer away from an array substrate, the third sub-layer comprises a third via hole configured to form the light-transmitting hole, and the third via hole is configured to set the light filter structure.

16. The display panel according to claim 14, further comprising an array substrate, wherein the light-shielding layer further comprises a second sub-layer disposed in the array substrate, the second sub-layer comprises a second via hole configured to form the light-transmitting hole, and the second via hole is configured to set the light filter structure.

17. The display panel according to claim 16, wherein the light sensor is disposed on the array substrate, and the light sensor is disposed on a light-emitting side of the second sub-layer.

18. The display panel according to claim 17, wherein the fingerprint identification module further comprises an optical lens, and the optical lens is disposed on a light incident side of the light-shielding layer and is configured to converge light that will enter the light-transmitting hole.

19. A display device, comprising a display panel, wherein the display panel comprises an array substrate, a liquid crystal layer and a fingerprint identification module, the fingerprint identification module comprises a light sensor and a light-shielding layer, and the light sensor is configured to receive light to generate a fingerprint identification signal;
wherein the light-shielding layer is disposed on a light incident side of the light sensor, and the light-shielding layer is formed with a light-transmitting hole;
wherein at least one light filter structure is disposed in the light-transmitting hole, and the light filter structure is configured to filter out all or a partial of preset wavelengths;
wherein when the light enters the light sensor through the light-transmitting hole, the light filter structure filters the light; and
wherein the light filter structure is a composite layer stacked with the color resist and the light-absorbing layer;
wherein the light-shielding layer further comprises a second sub-layer disposed in the array substrate, a side surface of the light-absorbing layer away from the light sensor is flush with a side surface of the second sub-layer away from the light sensor, and both are in contact with the liquid crystal layer.

* * * * *